Oct. 28, 1958 W. H. BLACK ET AL 2,858,529
PILOT ALARM CIRCUIT FOR USE IN CARRIER TRANSMISSION SYSTEMS
Filed May 7, 1957
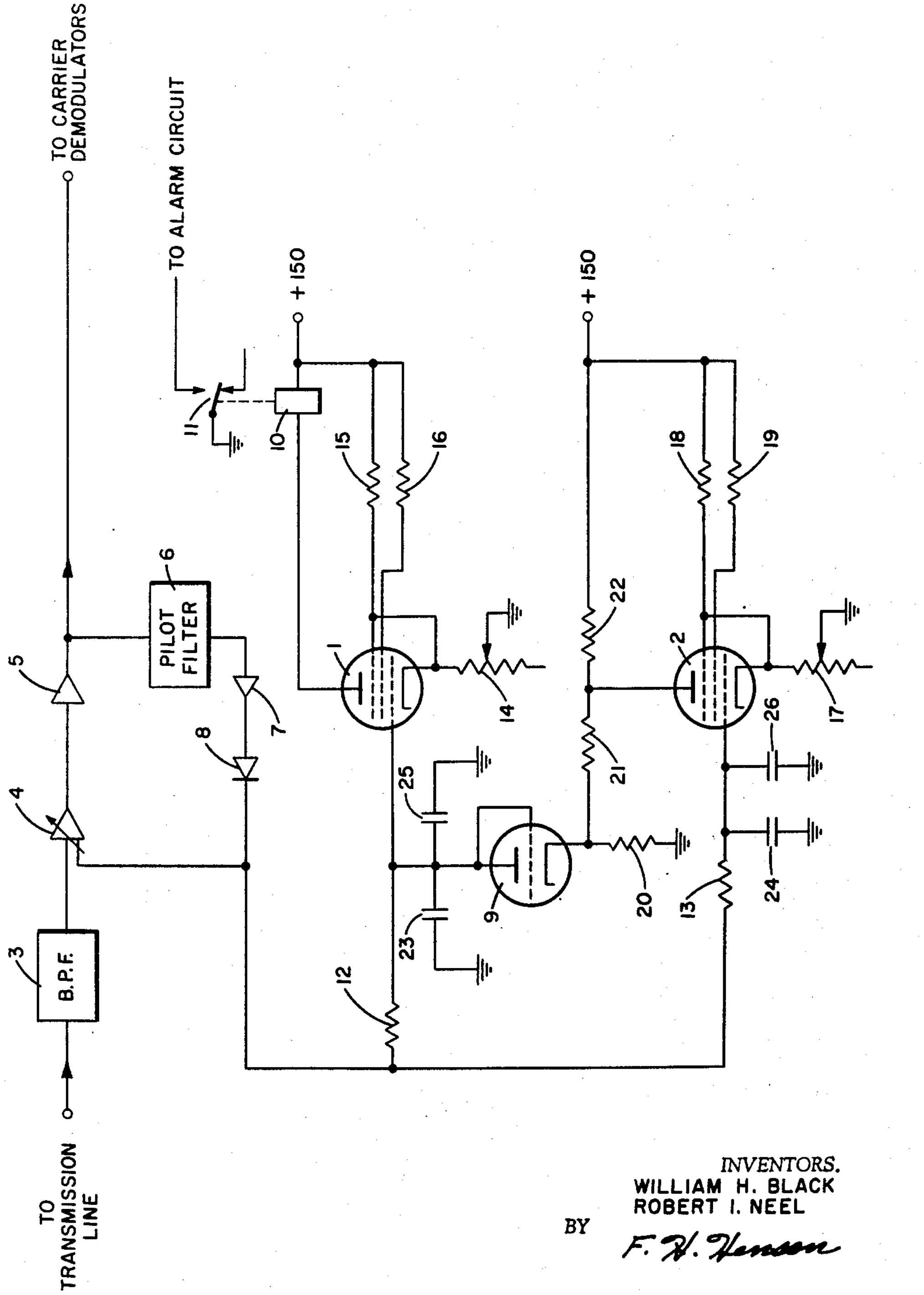
INVENTORS.
WILLIAM H. BLACK
ROBERT I. NEEL
BY F. H. Henson
AGENT 2,858,529

PILOT ALARM CIRCUIT FOR USE IN CARRIER TRANSMISSION SYSTEMS

William H. Black and Robert I. Neel, Rochester, N. Y., assignors to General Dynamics Corporation, Rochester, N. Y., a corporation of Delaware Application May 7, 1957, Serial No. 657,682

6 Claims. (Cl. 340—248)

The present invention relates in general to carrier transmission systems and, more particularly, to pilot alarm circuits for use in carrier transmission systems.

In carrier transmission systems it is the standard practice to adjust the gain characteristics of repeaters and receiving terminal equipment amplifiers in the transmission path in accordance with the changes in the attenuation of the transmission line. This is conventionally accomplished by the transmission of one or more pilot frequencies which are subjected to the same attenuation as the transmitted signal currents and the changes in amplitude of the received pilot signal are used to adjust the gain of the repeaters or of the receiving equipment in the proper manner to compensate for these changes. The gain of the repeaters or receiving equipment may be adjusted by directly adjusting the gain of amplifiers in the transmission path or by changing the impedance of impedance elements either in series or shunt with the transmission line.

It is also conventional to provide a pilot alarm circuit in the repeater or receiving equipment which serves to give an alarm whenever the received pilot signal falls below a first predetermined amplitude or exceeds a second predetermined amplitude. The pilot alarm circuits of the prior art employ either an expensive and delicate contact making volt-meter or a plurality of specially adjusted telephone type relays for this purpose.

It is the general object of this invention to provide a new and improved pilot alarm circuit for use in carrier transmission systems.

It is a more particular object of this invention to provide a new and improved pilot alarm circuit which comprises relatively inexpensive and maintenance-free circuit components.

In accordance with the present invention, the rectified pilot signal which is utilized to control the gain in the transmission path is also applied to the control electrodes of first and second signal translating devices which may be vacuum tubes, in the pilot alarm circuit. The first tube is biased for substantial conduction and operates an alarm relay connected in its plate circuit only when the rectified pilot signal exceeds a first predetermined amplitude. The second tube is biased for substantial conduction only when the rectified pilot signal exceeds a second predetermined amplitude. By means of a diode connected between the plate of the second tube and the control grid of the first tube, the first tube is controlled to assume a substantially non-conducting condition and thus release the alarm relay whenever the second tube becomes conductive. Thus, the alarm relay is released to complete a circuit to an alarm circuit whenever the rectified pilot signal is below a first predetermined amplitude or above the second predetermined amplitude.

Other objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawing which shows a portion of a carrier transmission receiving terminal in block diagram form, and circuit details of a pilot alarm circuit for use at that terminal.

As illustrated, carrier signals appearing on the transmission line are coupled through directional band-pass filter 3, amplified in variable gain amplifier 4, amplified in amplifier 5 and coupled to the various channel demodulators of the receiving equipment through individual channel band-pass filters in the well known manner. The received pilot signal is separated from the transmission path by pilot filter 6, amplified by amplifier 7, rectified by rectifier 8 and utilized to control the gain of variable amplifier 4. As is well known in the art, as the attenuation of the line increases, the amplitude of the received pilot signal decreases and amplifier 4 is controlled to increase its gain. Conversely, when the attenuation of the line decreases, the amplitude of the received pilot signal increases and amplifier 4 is controlled to reduce its gain.

The pilot alarm circuit provided comprises tubes 1 and 2, which may be type 6AH6 or one-half of a 6AU8, diode 9, which may be one-half of a 6AU8 or a crystal diode or any other unidirectional conducting device, and telephone type relay 10. As will be explained more fully hereinafter, relay 10 is held operated under normal operating conditions and thus its contacts 11, which close ground potential to the alarm circuit (not shown), are normally open so that an alarm is not transmitted. The rectified pilot signal is applied to the control grids of tubes 1 and 2 through resistors 12 and 13, respectively. The cathode of tube 1 is connected to the suppressor grid of tube 1 and both electrodes are returned to ground potential through adjustable resistor 14 and to +150 volts through resistor 15. The screen grid of tube 1 is also returned to +150 volts through resistor 16. Resistor 14 is initially adjusted in such manner that tube 1 is rendered substantially conductive and relay 10 operates only when the rectified pilot signal exceeds a first predetermined amplitude. It will be obvious that if the amplitude of the rectified pilot signal should drop below the first predetermined amplitude, the conductivity of tube 1 will decrease and relay 10 will release when the plate current of tube 1 is less than the release-current of the relay. Thus, if the attenuation of the line rises unduly, as for example in a sleet storm, or if the pilot signal is interrupted in any manner, relay 10 will release to apply an operating signal to the alarm circuit.

The rectified pilot signal is also coupled to the control grid of tube 2 for the purpose of controlling relay 10 to transmit an alarm if the rectified pilot signal should exceed a second predetermined amplitude. The cathode of tube 2 is connected to the suppressor grid of tube 2 and both electrodes are returned to ground potential through resistor 17 and to +150 volts through resistor 18. The screen grid of tube 2 is also returned to +150 volts through resistor 19. Resistor 17 is initially adjusted in such manner that tube 2 is rendered substantially conductive and diode 9 poled for conduction only when the rectified pilot signal exceeds a second predetermined amplitude, which is, of course, greater than said first predetermined amplitude. The cathode terminal of diode 9 is returned through resistor 20 to ground potential and through resistor 21 to the plate of tube 2, which, in turn, is returned through resistor 22 to +150 volt potential. The resistance values of resistors 20, 21 and 22 are so proportioned that the cathode terminal of diode 9 is held positive with respect to its anode terminal, which is connected to the control grid of tube 1, as long as tube 2 is substantially non-conductive. When the amplitude of the rectified pilot signals rises to the second predetermined amplitude and tube 2 is rendered substantially conductive, the potential at the plate of tube 2 drops toward the potential at the cathode of tube 2 and the voltage division across resistors 20 and 21 is such that diode 9 is poled in the forward direction. When diode 9 becomes conductive, the potential at the cathode terminal of diode 9 is coupled to the control grid of tube 1 and tube 1 is rendered non-conductive, relay 10 is released, and an operating signal is applied to the alarm circuit.

Capacitors 3 and 24 are provided in the circuit for the purpose of delaying the action of the circuit. Capacitors 23 and 24 are each connected between ground potential and the control grids of tubes 1 and 2, respectively. The time constants of the RC circuits comprising resistor 12 and capacitor 23 and resistor 13 and capacitor 24 are approximately twenty to thirty seconds so that the pilot alarm circuit is controlled only by the average voltage of the rectified pilot signal and not by fluctuations induced therein by momentary interruptions in transmission. Capacitors 25 and 26, which are connected in parallel with capacitors 23 and 24, respectively, may be small valued mica capacitors and are provided for the purpose of decoupling high-frequency signals contained in the rectified pilot signal from the grids of tubes 1 and 2, respectively.

While there has been shown and described what is at present considered to be the preferred embodiment of the invention, modifications thereto will readily occur to those skilled in the art. It is not desired, therefore, that the invention be limited to the arrangement shown and described, and it is intended to cover in the appended claims all such modifications as fall within the true spirit and scope of the invention.

What is claimed is:

1. In a carrier transmission system of the type wherein a received pilot signal is separated from the transmission path, is then rectified, and the rectified pilot signal is employed to control the electrical characteristics of the transmission path, a pilot alarm circuit comprising first and second signal translating devices, each of said devices having a current-emissive electrode, a current-receiving electrode, and a control electrode, means for applying the rectified pilot signal to the control electrodes of said first and second devices, first means for biasing said first device for substantial conduction only when said rectified pilot signal exceeds a first predetermined amplitude, means for biasing said second device for substantial conduction only when said rectified pilot signal exceeds a second predetermined amplitude, said second predetermined amplitude being greater than said first predetermined amplitude, means connected between the current-receiving electrode of said second device and the control electrode of said first device for overcoming the effect of said first means and rendering said first device substantially non-conductive whenever said second device is substantially conductive, and indicating means connected in circuit with the current-receiving electrode of said first device for indicating the state of conduction of said first device.

2. In a carrier transmission system of the type wherein a received pilot signal is separated from the transmission path, is then rectified, and the rectified pilot signal is employed to control the electrical characteristics of the transmission path, a pilot alarm circuit comprsing first and second signal translating devices, each of said devices having an anode, a cathode, and a control grid, means for applying the rectified pilot signal to the control grids of said first and second devices, a source of potential, means for returning the cathode of said first device to a point of potential of such value that said first device is rendered substantially conductive only when said rectified pilot signal exceeds a first predetermined voltage value, means for returning the cathode of said second device to a point of potential of such value that said second device is rendered substantially conductive only when said rectified pilot signal exceeds a second predetermined voltage value, said second predetermined voltage value being greater than said first predetermined voltage value, means connected between the anode of said second device and the control grid of said first device and responsive to the substantial conduction of said second device for rendering said first device substantially non-conductive, and indicating means connected in circuit with the anode of said first device for indicating the state of conduction of said first device.

3. In a carrier transmission system wherein a received pilot signal is separated from the transmission path, is then rectified, and the rectified pilot signal is employed to control the electrical characteristics of the transmission path, a pilot alarm circuit comprising first and second signal translating devices each having an anode, a cathode, and a control grid, means for coupling the rectified pilot signal to the grid of said first device through an impedance element, means for coupling the rectified pilot signal to the grid of said second device, means for returning the cathode of said first device to a point of potential of such value that said first device is rendered substantially conductive only when said rectified pilot signal exceeds a first predetermined voltage value, means for returning the cathode of said second device to a point of potential of such value that said second device is rendered substantially conductive only when said rectified pilot signal exceeds a second predetermined voltage value, said second predetermined voltage value being greater than said first predetermined voltage value, a diode connected between the anode of said second device and the grid of said first device for biasing said first device for substantial non-conduction when said diode is conductive, said diode being poled for conduction only when said second device is substantially conductive, and indicating means connected in circuit with the anode of said first device for indicating the state of conduction of said first device.

4. The system of claim 3 in which the indicating means is a relay, said relay being operated when said first device is substantially conductive and released when said first device is substantially non-conductive.

5. In combination, first and second signal translating devices, each of said devices having a current-emissive electrode, a current-receiving electrode, and a control electrode, means for applying a control signal to the control electrodes of said first and second devices, first means for biasing the current-emissive and control electrodes of said first device so that said first device becomes substantially conductive only when said control signal exceeds a first predetermined amplitude, means for biasing the current-emissive and control electrodes of said second device so that said second device becomes substantially conductive only when said control signal exceeds a second predetermined amplitude, said second predetermined amplitude being greater than said first predetermined amplitude, means connected between the current-receiving electrode of said second device and the control electrode of said first device for overcoming the effect of said first means and rendering said first device substantially non-conductive whenever said first device is substantially conductive, and indicating means connected in circuit with the current-receiving electrode of said first device for indicating the state of conduction of said first device.

6. In combination, first and second signal translating devices, each of said devices having an anode, a cathode, and a control grid, means for coupling a control signal to the grid of said first device through a first impedance element, means for coupling said control signal to the grid of said second device, a source of potential, means for returning the cathode of said first device to a point of potential of such value that said first device is rendered substantially conductive only when said control signal exceeds a first predetermined voltage value, means for returning the cathode of said second device to a point of potential of such value that said second device is rendered substantially conductive only when said control signal exceeds a second predetermined voltage value, said second predetermined voltage value being greater than said first predetermined voltage value, a diode connected between the anode of said second device and the grid of said first device for biasing said first device for substantial non-conduction when said diode is conductive, said diode being poled for conduction only when said second device is substantially conductive, and a relay connected in the anode circuit of said first device, said relay being operated when said first device is substantially conductive and released when said first device is substantially non-conductive.

References Cited in the file of this patent

UNITED STATES PATENTS 2,644,887 Wolfe ---------------- July 7, 1953

2,776,420 Woll ----------------- Jan. 1, 1957

UNITED STATES PATENT OFFICE

CERTIFICATE OF CORRECTION

Patent No. 2,858,529 October 28, 1958

William H. Black et al.

It is hereby certified that error appears in the printed specification of the above numbered patent requiring correction and that the said Letters Patent should read as corrected below.

Column 2, line 72, for "signals" read -- signal --; column 3, line 11, for "Capacitors 3" read -- Capacitors 23 --; line 30, for "readly" read -- readily --; line 66, for "comprsing" read -- comprising --.

Signed and sealed this 19th day of May 1959.

(SEAL)
Attest:

KARL H. AXLINE
Attesting Officer

ROBERT C. WATSON
Commissioner of Patents